United States Patent [19]

Goshima et al.

[11] 4,141,620
[45] Feb. 27, 1979

[54] LIGHT DEFLECTING DEVICE USING A POLYGON MIRROR WITH FLOAT MEMBERS

[75] Inventors: Takeshi Goshima, Tokyo; Shoji Ohta, Funabashi, both of Japan

[73] Assignee: Canon Kabushiki Kaisha, Tokyo, Japan

[21] Appl. No.: 845,631

[22] Filed: Oct. 26, 1977

[30] Foreign Application Priority Data

Nov. 9, 1976 [JP] Japan .................................. 51-134586

[51] Int. Cl.² ............................................... G02B 27/17
[52] U.S. Cl. ...................................................... 350/6.8
[58] Field of Search ..................... 350/6.8, 6.7, 310; 358/206; 352/108

[56] References Cited

U.S. PATENT DOCUMENTS 3,622,221 11/1971 Kossyk ..................... 350/6.8

*Primary Examiner*—Jon W. Henry
*Attorney, Agent, or Firm*—Fitzpatrick, Cella, Harper & Scinto

[57] ABSTRACT

In a light deflecting device using a polygon mirror, a polygon mirror member is provided which has a reference surface and a plurality of integral mirrored surfaces formed at a predetermined angle with respect to the reference surface. A fixing member resiliently fixes the polygon mirror member to a drive shaft for rotatively driving the polygon mirror member. The fixing member is effective to vary the angle formed between the reference surface and the drive shaft. A plurality of float members are provided in opposed relationship with the reference surface of the polygon mirror member and fixed independently of the rotation of the polygon mirror member. The float members are effective to produce a flow of air between the reference surface and the float members during rotation of the polygon mirror member to maintain a predetermined distance therebetween.

22 Claims, 9 Drawing Figures

LIGHT DEFLECTING DEVICE USING A POLYGON MIRROR WITH FLOAT MEMBERS

BACKGROUND OF THE INVENTION

1. Field of the Invention

This invention relates to a light scanning device using a polygon mirror.

2. Description of the Prior Art

Scanning a light beam by a light scanning device using a polygon mirror has been widely practised but it is very difficult to enhance the accuracy of the repetitive scanning position of the device without the use of correcting means. More specifically, when a light beam is deflected by a light scanning device using a polygon mirror, it is preferable to ensure the deflected light beam to scan always on the same locus on a member to be scanned. However, the polygon mirror and the rotary shaft for mounting it thereon have been machined separately from each other, whereafter they have been firmly coupled together for rotation as a unit. Thus, the machining errors of the polygon mirror and the rotary shaft have been brought out in a combined form which has increased the deviation of the repetitive scanning position of the light scanning device. The light scanning device using a polygon mirror according to the prior art will further be discussed by reference to FIG. 1 of the accompanying drawings.

A rotary shaft 1 rotatably supported by means of bearings 2 such as ball bearings or the like has integrally formed therewith a flanged portion 1a having a reference surface 1b for supporting thereon a polygon mirror 3. The polygon mirror 3 supported on the flanged portion 1a, as already noted, comprises a glass (or metal) block having the shape of, for example, a regular octagon, and formed with a through-aperture in the center thereof for mating with the rotary shaft 1. Each of the eight surfaces forming the octagon is formed as a mirrored surface parallel to the rotary shaft 1.

To enable the polygon mirror 3 to be rotated with the rotary shaft 1, the polygon mirror 3 is placed on the reference surface 1b of the flanged portion 1a with the underside of the polygon mirror as a reference surface 3a, and a washer 8 is overlaid on top of the polygon mirror 3, and a nut 9 threadably engageable with the externally threaded portion of the rotary shaft 1 is tightened to fix the polygon mirror to the rotary shaft. The polygon mirror 3 fixed to the rotary shaft 1 is dust-proofed by a casing 4, a portion of which is formed as a window 5 through which the light beam B may enter the reflecting surfaces of the polygon mirror 3 and be reflected outwardly thereby.

A pulley 6 is secured to one end of the rotary shaft 1 and may be rotatively driven from a motor, not shown, through a belt 7 connected to the motor, so that the incident light beam may be deflected to exit and scan.

In such light scanning device of the prior art, the machining precision of perpendicularity of the reference surface 1b of the flange to the center axis 0—0' of the rotary shaft 1 would suffer from an error of the order of ±3 seconds (of angle) if the existing machining method is resorted to, even though the machining was effected with considerable care carefully. Also, the machining precision of perpendicularity of each mirrored surface to the reference surface 3a of the polygon mirror 3 would likewise suffer from an error of the order of ±2 seconds. In addition to such machining errors of the two members, the light scanning device made by combining the two members involves an error attributable to the bearing precision of the rotary shaft and thus, the precision of the device as a whole is usually lower than the precision of each individual member forming the device.

Therefore, in the existing light deflecting device, an error of the order of ±5 seconds with respect to an ideal reflected light beam B0 has been the limit for the error between light beam B1 and B2 reflected from the respective reflecting surfaces of the polygon mirror.

In addition, such error has been greatly varied by the precision of assembly.

SUMMARY OF THE INVENTION

It is an object of the present invention to present a light deflecting device using a polygon mirror which is high in precision of deflection.

It is another object of the present invention to present a light deflecting device using a polygon mirror which is hardly affected as by the machining precision of the driving rotary shaft.

It is still another object of the present invention to present a light deflecting device using a polygon mirror which is very simple and economical in construction.

According to the present invention, the light deflecting device having a polygon mirror comprises a polygon mirror member having a reference surface and a plurality of integral mirrored surfaces formed at a predetermined angle with respect to the reference surface, a fixing member for resiliently fixing the polygon mirror member to a drive shaft for rotatively driving the polygon mirror member, the fixing member being effective to vary the angle formed between the reference surface and the drive shaft, and a plurality of float members opposed to the reference surface of the polygon mirror member and fixed independently of the rotation of the polygon mirror member, the float members being effective to produce a flow of air between the reference surface and the float members during rotation of the polygon mirror member to maintain a predetermined distance therebetween.

Other objects and features of the present invention will become fully apparent from the following detailed description of the invention taken in conjunction with the accompanying drawings.

BRIEF DESCRIPTION OF THE DRAWINGS

FIG. 1 is a cross-sectional view of the light deflecting device according to the prior art.

FIGS. 2 and 3 are a cross-sectional view and a top plan view, respectively, of the light deflecting device according to the present invention.

DESCRIPTION OF THE PREFERRED EMBODIMENTS

Figures 1, 2:
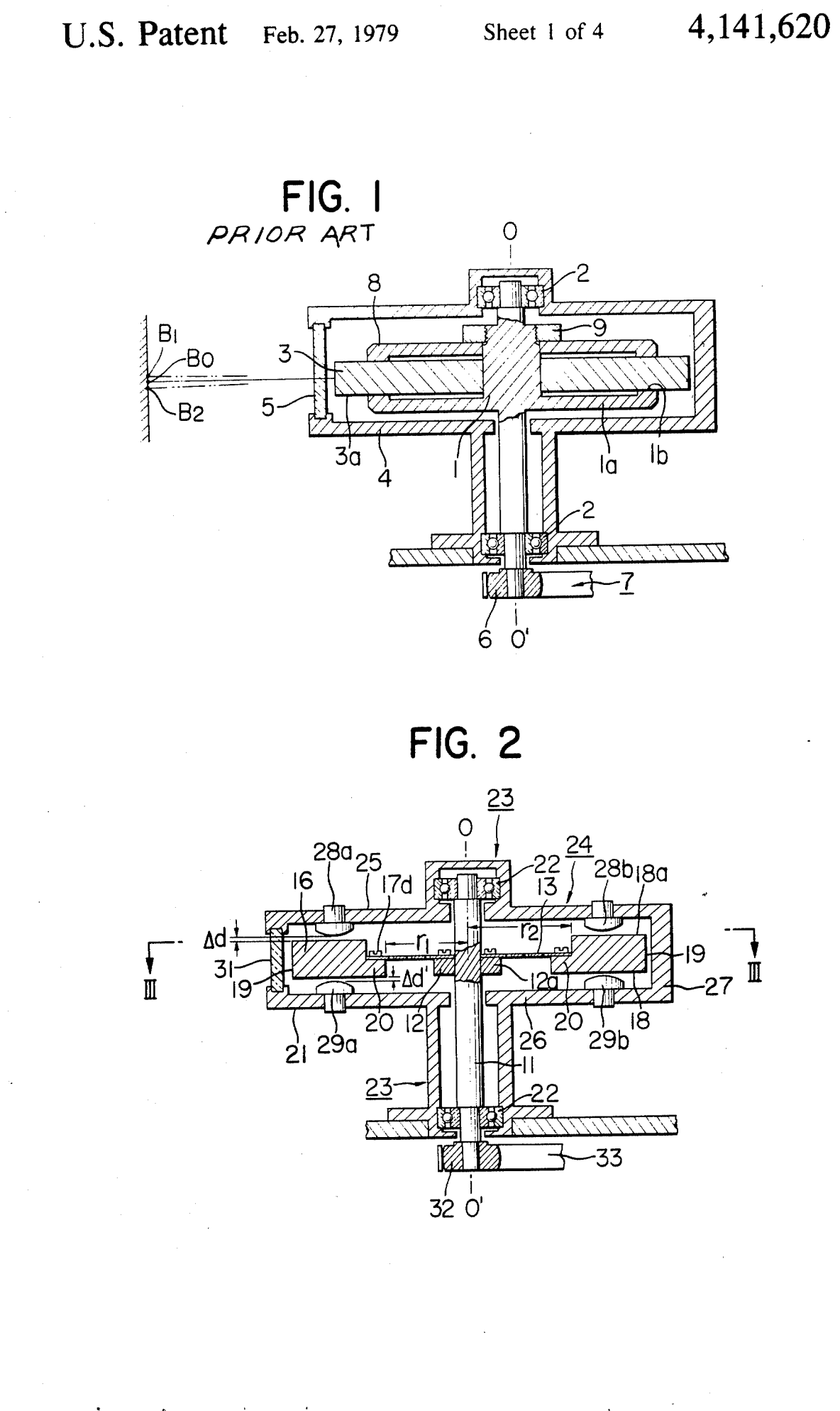
Figure 3:
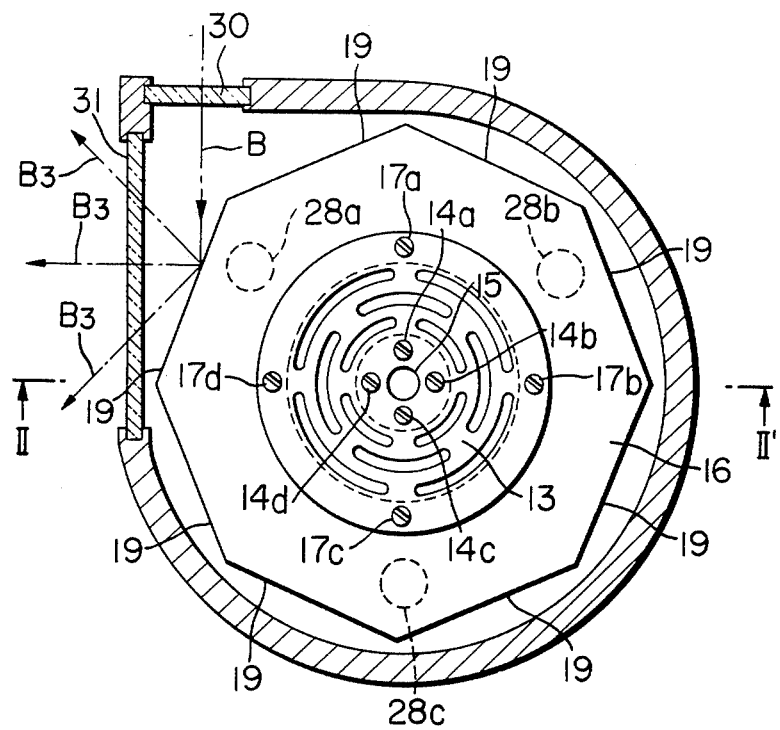

Referring to FIGS. 2 and 3, a rotary shaft is designated by 11 and a flange 12 is integrally formed with a portion of the rotary shaft 11. The upper surface 12a of the flange is formed so as to be perpendicular to the center axis 0—0' of the rotary axis 11 with a degree of precision obtainable by the ordinary machining process.

Secured to such flange 12 is a flexible flat member (gimbal spring) 13 which is a plate spring, by means of screws 14a, 14b, 14c and 14d. The flexible flat member has a through-aperture 15 formed centrally thereof for passing therethrough the rotary shaft 11, and the outer circumference thereof is formed into a circular shape.

A polygon mirror 16 is secured to the outer circumference of the flexible flat member 13 by means of screws 17a, 17b, 17c and 17d. The polygon mirror 16 comprises a glass block of regular octagonal cross-section, of which the underside is formed into a flat surface as a reference surface 18 and the eight circumferential surfaces are formed with reflecting layers to provide eight mirrored surfaces 19, each of the mirrored surfaces 19 forming an angle of precisely 90° with the reference surface 18. The upper surface 18a of the glass block is formed precisely parallel to the reference surface 18 and may be used as a second reference surface 18a.

The polygon mirror 16 is also formed with a circular through-aperture having a radius r1 from the center thereof and a cut-away portion of radius r2 which is slightly larger than said radius r1 and substantially equal to the radius of the flexible flat member 13, thereby providing an annular stepped portion 20 around the apertured portion of the polygon mirror 16. The upper surface of the stepped portion 20 is formed as a flat surface substantially parallel to the reference surface 18, and the circumferential portion of the flexible flat member 13 is secured to the upper surface of the stepped portion 20. The height of the stepped portion 20 is such that the flexible flat member 13, when so secured, lies substantially centrally of the upper and lower reference surfaces of the polygon mirror 16.

Since the flexible flat member 13 is thus mounted substantially centrally of the thickness of the polygon mirror 16, the rotative power of the rotary shaft 11 is transmitted along the plane of the flexible flat member 13 and this assures sufficient rigidity of the flexible flat member 13.

The rotatable polygon mirror of the above-described construction is enveloped by a casing 21, which comprises a holding portion 23 for rotatably holding the rotary shaft 11 by means of bearings 22, and an envelope portion 24 for enveloping the polygon mirror 16 and the flexible flat member 13. The envelope portion 24 comprises an upper flat base 25, a lower flat base 26 and a cylindrical portion 27.

The upper 25 and the lower flat base 26 are constructed such that their surfaces which are opposed to the polygon mirror 16 are flat, and three semispherical upper control members (float members) 28a, 28b, 28c and three semispherical lower control members (float members) 29a, 29b, 29c are respectively fixed to those portions of the upper 25 and the lower flat base 26 which are opposed to the lower and the upper surface of the polygon mirror 16.

These three upper and three lower control members are disposed in opposed relationship with each other with the polygon mirror 16 interposed therebetween and at positions corresponding to the verteces of an equilateral triangle centered at the rotary axis 11.

A glass 30 for letting the light beam B into the reflecting surface 19 of the polygon mirror 16 and a glass 31 for letting out the light beam B3 reflected by the reflecting surface 19 are fixed to respective parts of the cylindrical portion 27, and a pulley 32 is fixed to one end of the rotary shaft 11 and may be driven from a motor, not shown, through a belt 33 connected to the motor, whereby the motor drive may be transmitted to the light deflecting device.

In the light scanning device of the above-described construction, when the rotary shaft 11 is not being driven by a motor, not shown, the gravity of the polygon mirror 16 overcomes the resiliency of the flexible flat member 13 to displace the polygon mirror 16 downwardly, so that the reference surface 18 is held in contact with the lower control members.

As the motor is then started to gradually rotate the rotary shaft 11, the polygon mirror 16 also starts rotating. However, before the rotational velocity of the polygon mirror 16 reaches a predetermined number of revolutions a/m, the polygon mirror 16 is rotated as it is held by the lower control members 29, namely, with the reference surface 18 being in frictional contact with the lower control members 29.

When the velocity of the polygon mirror 16 exceeds the predetermined number of revolutions a/m, fluid in the vicinity of the reference surface of the polygon mirror 16 (in the present embodiment, air) flows into between the reference surface 18 and the lower control members 29 to cause the polygon mirror 16 to float up from the lower control member 29. That is, the fluid having flowed into between the reference surface 18 and the lower control member 29 is compressed at the top of the lower control member 29 to form a fluid layer which exerts a very great upward force which in turn causes the polygon mirror 16 to float up by an amount $\Delta d'$.

The amount of float $\Delta d'$ can be maintained constant if the number of revolutions of the polygon mirror 16 is a constant, b/m, and therefore the rotational plane of the polygon mirror 16 can be substantially determined by the aforementioned three lower control members 29a, 29b and 29c.

Thus, if only the machining precision of each reflecting surface of the polygon mirror 16 with respect to the reference surface is enhanced, the precision of the rotary shaft 11 and of the bearing therefor will be low and the precision of other parts and of the assembly will also be low, but due to the great resiliency of the resilient flat member 13 in the direction of thickness thereof, the deviation in the thrust direction will be absorbed and attenuated by the flexible flat member 13 and thus will not be transmitted to the polygon mirror 16, while only the deviation of the rotary shaft 11 in the radial direction will be transmitted to the polygon mirror 16.

In this manner, the deviation of the rotary shaft 11 can also be absorbed by the lower control members 29 alone to thereby rotate the polygon mirror 16 with high precision.

However, if the gravity of the polygon mirror 16 is reduced in order to prevent any adverse effect due to the rotative contact between the lower control members 29 and the polygon mirror 16 at the starting of the latter and to reduce the load of the motor, the pressure force (gravity) downwardly forcing the polygon mirror 16 will be weakened to readily permit the polygon mirror to float up when the polygon mirror 16 is rotating at the velocity of a/m.

It has empirically been found that if the lower control member is singly present, the polygon mirror suffers from spattering under the influence of the disturbed flow of fluid, which in turn results in great deviation of the rotary shaft.

For this reason, in the embodiment shown in FIG. 2, upper control members 28 are further provided to make the scanning device higher in precision. More specifically, when the polygon mirror 16 is rotating at the velocity of a/m, the distance Δd between the upper control member 28 and the reference surface 18b is set to Δd and this distance Δd is chosen to a value over which the upper control member 28 may sufficiently force down the polygon mirror 16 through the fluid layer. Thus, the position of the polygon mirror 16 during its rapid rotation is controlled both by the lower 29 and the upper control members 28 and even if the rotary shaft 11 is deviated, the deviation only occurs in a direction parallel to the radial direction, so that only the angular error of the reflecting surface 19 with respect to the reference surface 18 during manufacture presents itself in the form of deviation of the deflected scanning light. Therefore, if only the machining precision of the polygon mirror 16 is enhanced, the deflected scanning light may be obtained at a predetermined position irrespective of the precision of other parts.

Thus, the present invention can provide a light deflecting device which is free of the irregularities in precision resulting from the combination of the parts and is stable in assembly precision.

Also, the provision of both the lower and the upper control members as described enables the light scanning device to be used without its attitude being limited and irrespective of the angle formed by the rotary shaft 11 with respect to the direction of gravity.

In the device shown in FIGS. 2 and 3, the upper 28 and the lower control members 29 are disposed with their amounts of projection unadjustable with respect to the upper 25 and the lower flat plate 26, respectively, but the amounts of projection of such control members 28 and 29 should preferably be adjustable.

Figure 4:
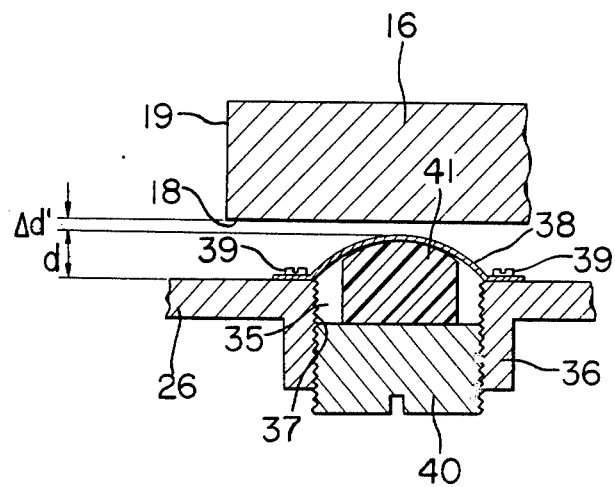
FIGS. 4 and 5 are cross-sectional views showing two forms of the mechanism for adjusting the amounts of projection of control members.

FIG. 4 shows an embodiment in which the control members are disposed with adjustable amounts of projection. In this embodiment, a through-aperture 35 is formed in a portion of the lower flat plate 26 and a cylindrical portion 36 is provided in communication with the through-aperture 35, the inner wall of the cylindrical portion 36 being provided with threaded grooves 37. On the other hand, over the through-aperture 35, a spring member 38 formed in a semispherical shape by a resilient plate excellent in wear resistance is secured by means of screws 39 so as to cover the top of the through-aperture 35.

A screw 40 is threaded into the interior of the cylindrical portion 36. Such screw 40 has an urge member 41 integrally secured thereto. The arc formed by the upper end of the urge member 41 is chosen to be smaller than the arc formed by the spring member 38 and thus, by upwardly moving the screw 40, the upper end of the urge member 41 may be caused to deform the spring member 38 to thereby upwardly curve the top of the spring member 38.

Thus, the distance Δd' between the polygon mirror 16 and the reference surface 18 may be freely adjusted by turning the screw 40.

Figure 5:
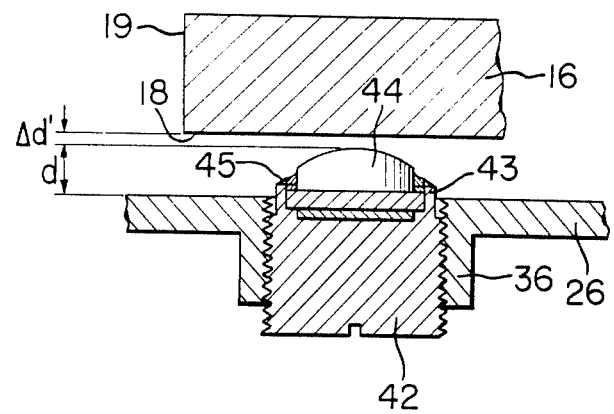

FIG. 5 shows another embodiment in which the amounts of projection of the control members are adjustable. In this embodiment, an annular projection 43 is provided around the top of the screw 42 and a semispherical projected member 44 formed of wear resistant material such as ceramics is secured to the inner wall of the projection 43 by means of adhesive 45.

Thus, by turning the screw 42, the distance d can be freely selected in the same manner as described in connection with FIG. 4.

In FIGS. 4 and 5, only the amounts of projection of the control members are adjustable, but it is more desirable that not only the amounts of projection but also the inclinations of the control members be adjustable.

Figure 8:
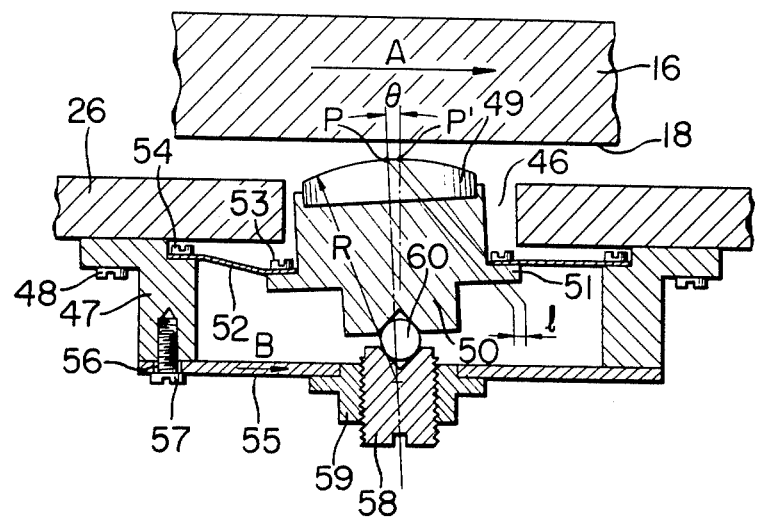
FIGS. 8 and 9 are cross-sectional views showing a mechanism for adjusting the amount of projection of a control member.

Such as embodiment is shown in FIG. 8, wherein the polygon mirror 16 is rotated in the direction of arrow A. A lower control member mounting frame 47 is secured to the underside of the lower flat plate 26 by means of screws 48. A semispherical lower control member 49 is held by a holder 50 having a flanged portion 51, and a gimbal spring 52 for supporting the holder 50 has the inside diameter portion thereof secured to the flanged portion 51 of the holder 50 by means of screws 53, while the outside diameter portion of the gimbal spring 52 is secured to the stepped inside diameter portion of the mounting plate 47 by means of screws 54. With such a construction, the semispherical lower control member 49 may be projected through an opening 46 in the lower flat plate 26 into opposed relationship with the reference surface 18 of the polygon mirror 16. An adjust plate 55 extends through an adjust holes 56 and is secured to the underside of the mounting frame 47 by means of screws 57, and a female screw portion 59 for threadably receiving therein a screw 58 for adjusting the amount of projection of the control member is secured to the central portion of the adjust plate 55. The central portion of the upper end surface of the projection adjust screw 58 and the central portion of the lower end surface of the holder 50 are respectively formed with conical recesses opposed to each other, and a steel ball 60 is supported by and between these two conical recesses by utilization of the vertical spring force of the gimbal spring 52, thereby connecting together the adjust screw and the holder.

In this construction, if a manufacturing error of the semispherical lower control member 49 causes the center of curvature of the semisphere to be deviated from the center axis X—X' and the vertex of the semisphere to be deviated from the center point P of the lower control member 49, or if the semispherical lower control member 49 is made properly but it is desired to increase the upward force of the polygon mirror 16 by purposely deviating the point of proximation of the semisphere to the lower reference surface 18 of the polygon mirror 16, from the center point P of the circle to a point P' offset by a distance l in the direction of arrow A which indicates the rotational direction of the polygon mirror 16, adjustment of the amount of projection and inclination of the semispherical lower control member may be accomplished by horizontally moving the adjust plate 55 in the direction of arrow B (or in the opposite direction) within the size range of the adjust hole 56 in the adjust plate 55, thereafter fixing the adjust plate 55 by means of a screw 57, thereby utilizing the flexure of the gimbal spring 52 supporting the holder 50 to incline the holder 50 by an angle of θ through the intermediacy of the steel ball 60.

Figure 9:
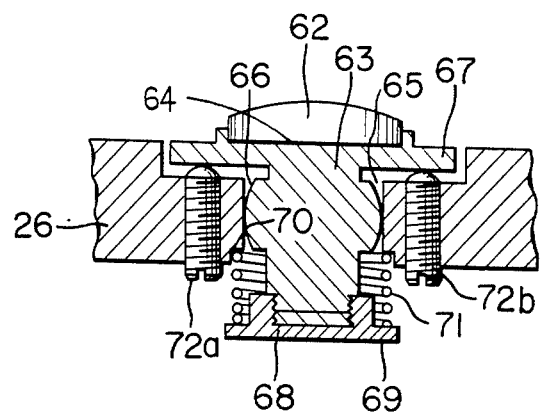

FIG. 9 shows a further embodiment of the mechanism for adjusting both the amount of projection and the inclination of the control member. A semispherical control member 62 is held in a recess 64 formed in the top surface of a holder 63. The holder 63 comprises a spherical portion 66 fitted in a center hole 65 through a lower flat plate 26 and serving as a guide during adjustment of the amount of projection and the inclination of the control member 62, a flange 67 formed around the recess holding therein the control member 62, and a stopper 68 disposed at the lower end. A compression spring 71 is disposed between the flange 69 of the stopper and the recess 70 formed in the lower surface of the lower flat plate 26, whereby the holder 63 is normally biased downwardly.

Screws 72a, 72b and 72c (the last one is not shown) are threaded into the lower flat plate 26 at three locations around the hole 65 receiving the holder 63 therein, and the upper tip ends of these screws are in abutment with the lower surface of the flange 67 of the holder 63. In this construction, the control member 62 may be rectilinearly projected by turning the screws 72a, 72b and 72c by an equal amount. The inclination of the control member 62 may also be adjusted by adjusting the three screws discretely by suitable amounts.

Figure 6:
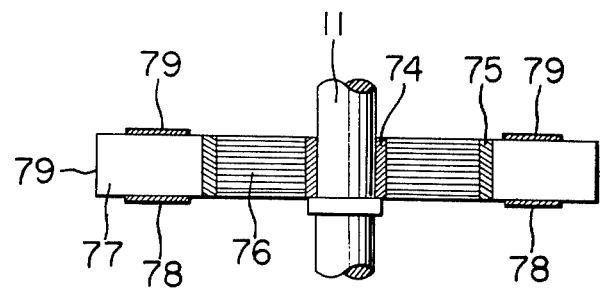
FIG. 6 shows, in cross-section, another form of the polygon mirror used with the present invention.

FIG. 6 shows a further embodiment of the rotatable polygon mirror used in the present invention. In this embodiment, there is provided a ring 74 fitted or adhesively secured to the rotary shaft 11 and another ring 75 having a larger diameter than the ring 74, and a flexible member 76 formed of rubber or like material fills the gap between the two rings 74 and 75. The outer periphery of the ring 75 is surrounded by and coupled to a polygon mirror 77 having the construction as shown in FIGS. 2 and 3 (although this polygon mirror 77 differs from the polygon mirror 16 in that the stepped portion 20 is absent).

On those portions of the polygon mirror 17 which are opposed to the lower and upper control members, not shown, sheets of a material excellent in wear resistivity may be adhesively secured or a material excellent in wear resistivity may be deposited by vaporization to form wear resistive layers 78 and 79, respectively. Formation of such wear resistive layers may be effected by flattening the underside of the wear resistive layer 78 to provide a reference surface for machining, thereafter forming the wear resistive layer 79 as a parallel surface to the layer 78, and then reflecting surfaces 79 may be formed on the outer periphery of the polygon mirror 77 with the wear resistive layer 78 as the reference.

It will be apparent that using the rotatable polygon mirror of FIG. 6 instead of that shown in FIGS. 2 and 3 may result in the same effect as described in connection with FIGS. 2 and 3.

Figure 7:
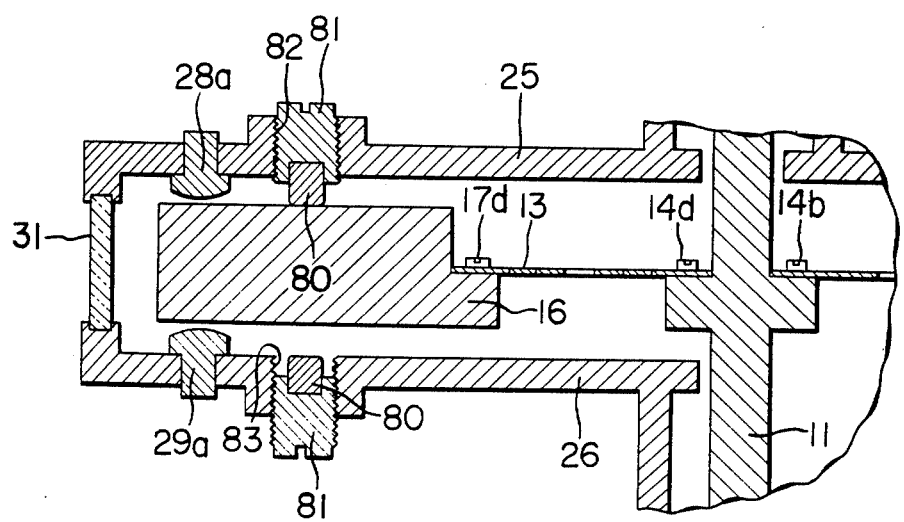
FIG. 7 is a cross-sectional view of clamp means.

FIG. 7 shows clamp means for fixing the polygon mirror either when not in rotation or during transportation of the device. Such clamp means comprises screws 81 each having a soft material such as rubber or resin secured to one end thereof, the screws 81 being threadably inserted in threaded holes 82 and 83 formed in the upper and lower flat plates 25 and 26 until the soft materials 80 securely hold the polygon mirror 16 therebetween.

In FIG. 7, the soft material 80 is urged against the polygon mirror 16 by each screw 81, but instead of the screw 81, an electromagnetic plunger or the like may be used to urge the soft material 80 against the polygon mirror 16. In this latter case, stopped rotation of the polygon mirror 16 may be detected to automatically effect clamping.

Throughout the drawings, similar reference characters designate similar members having similar functions.

In FIGS. 4 to 9, those portions which are not shown are similar in construction.

What we claim is:

1. A light deflecting device having a polygon mirror, comprising:
   a polygon mirror member having a reference surface and a plurality of integral mirrored surfaces formed at a predetermined angle with respect to said reference surface;
   a fixing member for resiliently fixing said polygon mirror member to a drive shaft for rotatively driving said polygon mirror member, said fixing member being effective to vary the angle formed between said reference surface and said drive shaft; and
   a plurality of float members opposed to said reference surface of said polygon mirror member and fixed independently of the rotation of said polygon mirror member, said float members being effective to produce a flow of air between said reference surface and said float members during rotation of said polygon mirror member to maintain a predetermined distance therebetween.

2. A light deflecting device according to claim 1, wherein said fixing member comprises a plate-like resilient member.

3. A light deflecting device according to claim 1, wherein said float members are equidistantly disposed at three locations respectively.

4. A light deflecting device according to claim 1, wherein said polygon mirror member has a cut-away portion including at least the rotational axis thereof.

5. A light deflecting device according to claim 4, wherein said fixing member comprises a plate-like resilient member fixed to said cut-away portion.

6. A light deflecting device according to claim 2, wherein said plate-like resilient member comprises a gimbal spring.

7. A light deflecting device according to claim 1, further comprising clamp means for clamping said polygon mirror member.

8. A light deflecting device according to claim 1, wherein said fixing member comprises a flexible member filling the gap between a small-diametered ring member and a large-diametered ring member.

9. A light deflecting device having a polygon mirror, comprising:
   a polygon mirror member having a first reference surface and a second reference surface parallel to said first reference surface, and having a plurality of mirrored surfaces formed at a predetermined angle with respect to said first reference surface;
   a fixing member for resiliently fixing said polygon mirror member to a drive shaft for rotatively driving said polygon mirror member;
   a plurality of first float members opposed to said first reference surface of said polygon mirror member and fixed independently of the rotation of said polygon mirror member; and
   a plurality of second float members opposed to said second reference surface of said polygon mirror member and fixed independently of the rotation of said polygon mirror member.

10. A light deflecting device according to claim 9, further comprising an envelope member for enveloping said polygon mirror member and said fixing member.

11. A light deflecting device according to claim 10, wherein said envelope member has a light inlet window for letting light therethrough into said envelope member and a light outlet window through which said inlet light may exit out of said envelope member by being reflected by said mirrored surfaces.

12. A light deflecting device according to claim 9, wherein said first and said second float members are opposed to each other with said polygon mirror member intervening therebetween.

13. A light deflecting device according to claim 9, wherein those ends of said first and second float members which are opposed to said polygon mirror member are formed in an arcuate shape.

14. A light deflecting device according to claim 9, further comprising clamp means for clamping said polygon mirror member.

15. A light deflecting device according to claim 9, further comprising a wear-resistive layer fixedly disposed on that portion of said polygon mirror member which is opposed to said first float members.

16. A light deflecting device having a polygon mirror, comprising:
 a polygon mirror member having a reference surface and a plurality of integral mirrored surfaces formed at a predetermined angle with respect to said reference surface;
 a fixing member for resiliently fixing said polygon mirror member to a drive shaft for rotatively driving said polygon mirror member, said fixing member being effective to vary the angle formed between said reference surface and said drive shaft;
 a base opposed to said reference surface of said polygon mirror member and fixed independently of the rotation of said polygon mirror member;
 a plurality of float members disposed on said base in opposed relationship with said reference surface and fixed independently of the rotation of said polygonal mirror member, that end of each of said float members which is opposed to said reference surface being formed in an arcuate shape; and
 adjust means for adjusting the inclination of said float members.

17. A light deflecting device according to claim 16, wherein said base is substantially parallel to said reference surface.

18. A light deflecting device according to claim 16, wherein each of said float members is disposed projectedly from said base toward said polygon mirror member and has means for adjusting the amount of projection of said float member.

19. A light deflecting device according to claim 16, further comprising an envelope member for enveloping said polygon mirror member and said fixing member, and wherein said base forms a part of said envelope member.

20. A light deflecting device having a polygon mirror, comprising:
 a polygon mirror member having a first reference surface and a second reference surface parallel to said first reference surface, and having a plurality of mirrored surfaces formed at a predetermined angle with respect to said first reference surface;
 a through-aperture formed in said polygon mirror member so as to be symmetric about the rotational axis of said polygon mirror member;
 a plate-like resilient member fixed to said polygon mirror member so as to cover said through-aperture;
 a drive shaft fixed to said plate-like resilient member in such manner that the rotational axis of said drive shaft is coincident with the rotational axis of said polygon mirror member;
 a first base disposed in opposed relationship with said first reference sufface;
 three first float members disposed on said first base in opposed relationship with said first reference surface and fixed independently of the rotation of said polygonal mirror member, that end of each of said float members which is opposed to said first reference sufface being formed in an arcuate shape;
 a second base disposed in opposed relationship with said second reference surface; and
 three second float members disposed on said second base in opposed relationship with said second reference surface and fixed independently of the rotation of said polygonal mirror member, that end of each of said second float members which is opposed to said first reference surface being formed in an arcuate shape.

21. A light deflecting device according to claim 20, wherein said drive shaft has a stepped portion to which said plate-like resilient member is fixed.

22. A light deflecting device according to claim 20, further comprising clamp means which comprises a first urge member provided on said first base for urging said polygon mirror member and a second urge member provided on said second base for urging said polygon mirror member.

* * * * *

UNITED STATES PATENT AND TRADEMARK OFFICE
CERTIFICATE OF CORRECTION

PATENT NO. : 4,141,620
DATED : February 27, 1979
INVENTOR(S) : TAKESHI GOSHIMA, ET AL It is certified that error appears in the above-identified patent and that said Letters Patent are hereby corrected as shown below:

Column 1, line 63, after "care", delete "carefully".

Column 9, line 36, in Claim 16, delete "polygonal" and insert --polygon--.

Column 10, line 24, in Claim 20, delete "sufface" and insert --surface--;

Column 10, line 28, in Claim 20, delete "polygonal" and insert --polygon--;

Column 10, line 30, in Claim 20, delete "sufface" and insert -- surface --.

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*